(12) United States Patent
Kamath et al.

(10) Patent No.: US 8,909,675 B2
(45) Date of Patent: Dec. 9, 2014

(54) EXECUTING TRANSCRIPTION REQUESTS ON FILES

(75) Inventors: Harish B Kamath, Bangalooru Karanataka (IN); Pai K Atul, Bangalore Karnataka (IN)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 13/639,266

(22) PCT Filed: May 8, 2010

(86) PCT No.: PCT/US2010/034148
§ 371 (c)(1),
(2), (4) Date: Oct. 4, 2012

(87) PCT Pub. No.: WO2011/142737
PCT Pub. Date: Nov. 17, 2011

(65) Prior Publication Data
US 2013/0031150 A1    Jan. 31, 2013

(51) Int. Cl.
*G06F 17/30* (2006.01)
*G06F 17/22* (2006.01)

(52) U.S. Cl.
CPC .......... *G06F 17/2264* (2013.01); *G06F 17/30* (2013.01)
USPC ............ 707/791; 707/802; 707/822; 707/828

(58) Field of Classification Search
CPC ....................................................... G06F 17/30
USPC ................................................. 707/600–899
See application file for complete search history.

(56) References Cited

U.S. PATENT DOCUMENTS

| | | | |
|---|---|---|---|
| 5,423,043 A | 6/1995 | Fitzpatrick et al. | |
| 6,049,799 A | 4/2000 | Mangat et al. | |
| 6,549,896 B1 | 4/2003 | Candan et al. | |
| 6,694,484 B1 | 2/2004 | Mueller | |
| 2007/0109574 A1 | 5/2007 | Savov | |
| 2008/0016356 A1 | 1/2008 | Filreis et al. | |
| 2008/0091845 A1* | 4/2008 | Mills et al. | 709/246 |
| 2008/0246991 A1* | 10/2008 | Haneda et al. | 358/1.15 |

FOREIGN PATENT DOCUMENTS

| | | |
|---|---|---|
| CN | 1770747 A | 5/2006 |
| CN | 101055577 A | 10/2007 |
| EP | 1923830 A2 | 5/2008 |

OTHER PUBLICATIONS

International Search Report and Written Opinion, International Application No. PCT/US2010/034148, Date of Mailing: Jan. 28, 2011, pp. 1-13.

* cited by examiner

*Primary Examiner* — Isaac M Woo

(57) ABSTRACT

One embodiment is method that receives a file and a transcription request to alter contents of the file. The file is associated with a file format, and the transcription request is associated with a function that will alter the contents of the file according to the transcription request. The function is executed on the file to alter the file format and to alter the contents of the file according to the transcription request.

20 Claims, 8 Drawing Sheets

EXECUTING TRANSCRIPTION REQUESTS ON FILES

FIELD OF THE INVENTION

The present invention relates to executing transcription requests on files.

BACKGROUND

The rules to open, edit and/or print a file are tightly bound to an application along with the MIME type or file extension. The association is configuration driven and is tightly connected to the use or file type.

Documents can be used for different purposes on a system where various associations correspond with an application. As an example, printing for a team usage association may be based on a team rule, whereas editing the association may have an edit (functional) rule to open. Furthermore, the association is typically driven by the capability of an application. As such, electronic devices have a narrow range of functions and features that can be performed with a file.

SUMMARY OF THE INVENTION

Figure 1:
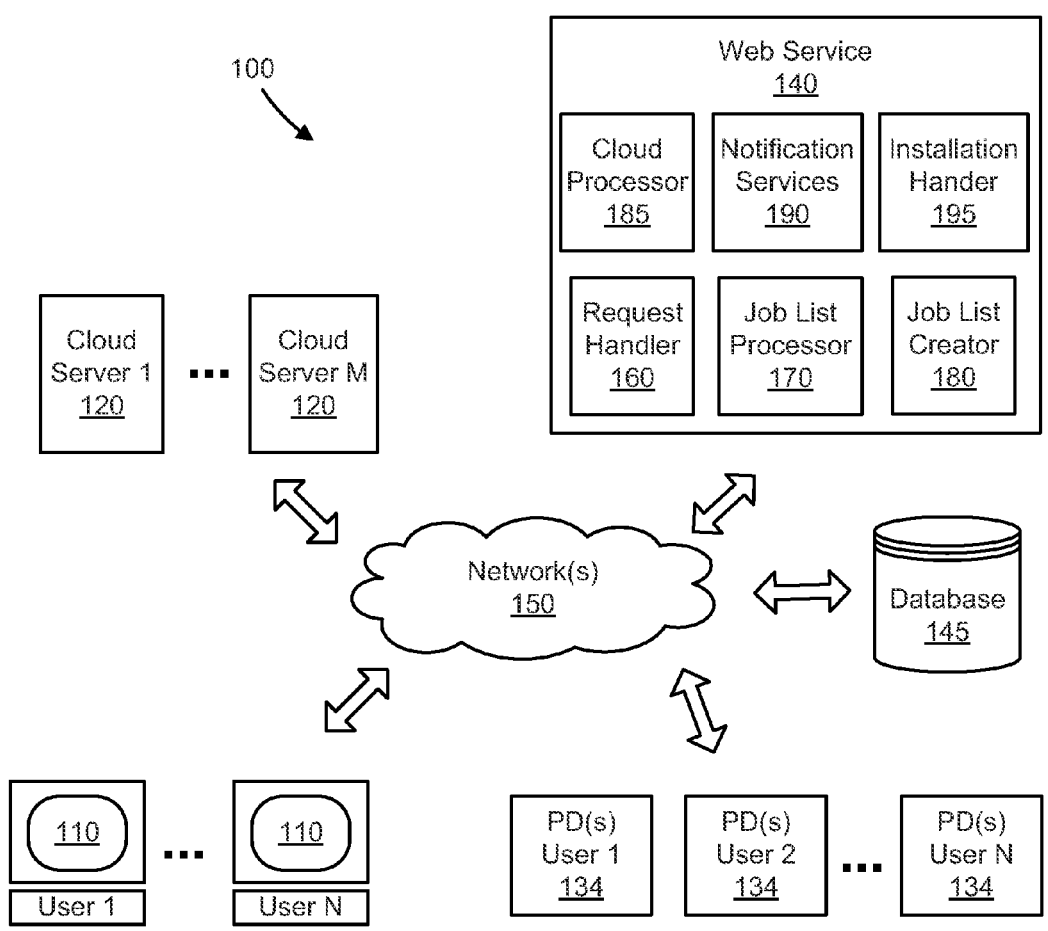
FIG. 1 shows a cloud print system in accordance with an example embodiment.

One embodiment is method that receives a file and a transcription request to alter contents of the file. The file is associated with a file format, and the transcription request is associated with a function that will alter the contents of the file according to the transcription request. The function is executed on the file to alter the file format and to alter the contents of the file according to the transcription request.

DETAILED DESCRIPTION

Example embodiments relate to apparatus and methods that associate documents or files to applications. Association between a document or file and the application is based on a set and a rule. The set contains a list of applications and a rule to develop the corresponding association.

Documents are associated with an application, and the rule of association is static, typically defined by a user, and is driven by a Multipurpose Internet Mail Extension (MIME) type of the file. With example embodiments, associations of documents with applications are made to be dynamic with the MIME type and/or other set of parameters, such as context, utility, etc.

As used herein and in the claims, "MIME" or "Multipurpose Internet Mail Extension" is an internet standard that extends the format of email to support text in characters sets other than American Standard Code for Information Interchange (ASCII), non-text attachments, message bodies with multiple parts, and header information in non-ASCII character sets. MIME also describes content other than email, such as general content for the web. By way of example, internet email is typically transmitted via Simple Mail Transfer Protocol (SMTP) in MIME format. MIME standards are also used in communication protocols, such as Hypertext Transfer Protocol (HTTP) and World Wide Web.

With example embodiments, documents and files have a format that can be operated with one or more different applications. A MIME type or a file extension governs the rules for associating file with applications. Typically, a user opens a file by double clicking on an object/icon associated with the document or navigating a drop-down menu. Another way to perform this association is to right click on the document or file and select an application from a list of available applications.

The following examples show documents or files being associated with one or more different applications:

1. Txt/Log/C/C++/JAVA/JavaScript files can be opened by an application from the following set {Notepad, Wordpad, Visual Studio, Internet Explorer (IE), . . . }.

2. DOC (document file extension), PPT (Powerpoint file extension), XLS (Excel file extension) files can be associated with {Office, OpenOffice, Third Party Viewer}.

3. ZIP files can have an association with {WinZIP, WinRAR, PKZIP, . . . }.

4. HTML files can have an association with {Internet Explorer, Google Chrome, Safari, Microsoft Office, . . . }.

5. PDF (Portable Document Format) files can have an association with {Acrobat Reader, Writer, . . . }.

By way of example, a user can use Wordpad to view C++ files and while printing via Visual Studio. The fonts and features with these applications are different. This user may use Visual Studio to print because the printouts are re-used by other individuals (e.g., team members), and the printouts provide a desired style with particular fonts, line-numbers in use, etc.

Other examples include the following:

a) Consider a user having an international profile. This user would be able to view a document in association with translator (e.g., open a document in English but get content in another language, such as French or German).

b) When the user clicks on a PPT file icon, SlideShow viewer opens instead of the PowerPoint application since this viewer is designated in the user profile.

c) When the user previews a color document for a black and white printer, the pages are viewed in a black and white mode. If the user switches to edit context in this state, the contents are rendered in black and white and use the application that matches the printer.

d) User profiles can also pre-define an association rule for viewing certain types of files. An example rule would be filter advertisements and reformat contents and view when an HTML page is opened. The rule to select the filters, formatters or content viewers may in turn cause a nested effect.

Thus, rules can be of one or more of the following types:

1. File Extension, MIME type based;
2. Utility based;
3. Profile based;
4. Capability oriented;
5. Content based; or
6. Application state (context).

Given these rules in a cloud system, example embodiments work with data, meta-data and users instead of working with data in the context of an application level. The application can be dynamically associated with the user's data and deliver metadata based on the rules associated for the operation being performed. The association rules and relationship may be saved in memory, displayed or transmitted to a user or computer, formed as a graph, etc.

FIG. 1 shows a cloud print system 100 in accordance with an example embodiment of the present invention. The system includes a plurality of users or computers 110 (shown as user 1 to user N), a plurality of cloud servers 120 (shown as cloud server 1 to cloud server M), a plurality of printing devices (PD) 134 for the users, a web service 140, and a database 145 in communication with each other through one or more networks 150 (such as the internet and world wide web or web). The web service 140 further includes a request handler 160, job list processor 170, job list creator 180, cloud processor 185, notification services 190, and installation handler 195. The cloud processor 185 performs processing functions for the cloud, and the notification services 190 notifies a user, computer, or administrator of job status, such as print job complete, printing error, etc. The installation handler 195 communicates with the printing devices 134 to install the printing devices, as discussed herein with example embodiments.

The cloud print system provides printing services to users who connect to the cloud through the internet. Users are able to print/copy/scan to their printing devices from different geographical locations around the world upon installing a printing device and establishing ownership or user rights with the printing device.

Generally, a print job work item is performed with the following operations: handling user requests, creating a job list, and processing the job list. The print job request handler 160 acts on user requests. The job list creator 180 creates job steps, and the job list processor 170 executes the job steps according to the assigned priorities.

Figure 2:
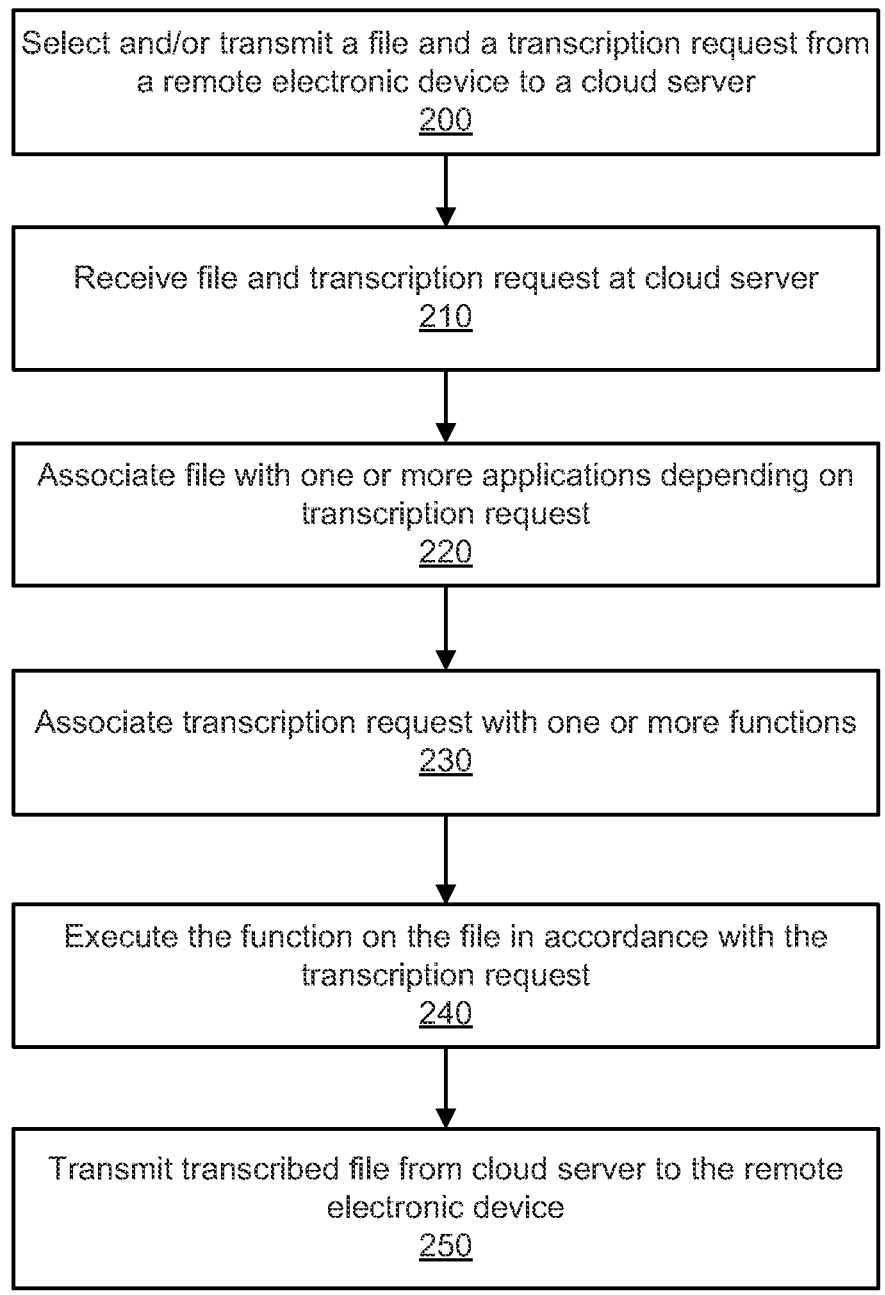
FIG. 2 shows a flow diagram to execute a transcription request on a file received from a remote electronic device in accordance with an example embodiment.

FIG. 2 shows a flow diagram to execute a transcription request on a file received from a remote electronic device in accordance with an example embodiment.

According to block 200, a file and a transcription request are selected or transmitted from a remote electronic device to a cloud server. For example as shown in FIG. 1, a user transmits a file stored on a remote electronic device 110 through networks 150 to a cloud server 120. Alternatively, the file could be retrieved by the cloud server (e.g., retrieved from a storage location designated by the user, retrieved from a web location, etc.).

By way of example, the transcription request is:
a) Print Diagrams.Visio Printer=CloudPrinter21 WaterMarkType=Image WaterMark=Draft.JPG; or
b) Play Report.Doc Service=CloudAudio Output=MPEG Level=2 Quality=Medium.

According to block 210, the cloud server receives, retrieves, or obtains the file and the transcription request.

According to block 220, the file is associated with one or more applications depending on the transcription request. A single file can be associated with a plurality of different applications. For example, a DOC file can be converted to an Extensible Markup Language (XML) file and then to a PDF file.

In one example embodiment, a type of file is determined. For example, a file format or a filename extension is used to determine that the file is a Doc file, a PDF file, a PPT file, etc. As used herein and in the claims a "file format" is particular way that information is enclosed for storage of a computer file. For example, file formats include, but are not limited to, JPEG formats, HTML formats, etc. The file format is determined using different techniques that depend on the file system (e.g., using a file extension, internal metadata, file header, etc.) As used herein and in the claims, a "filename extension" is a suffix to name a computer file applied to indicate an encoding convention or file format of the contents of the file. In some operating systems (OS), the extension is a substring that follows the last occurrence of dot characters (e.g., a file name "agreement.html"). In other OS, the extension is a separate namespace from the filename. In yet other OS (such as Unix), a suffix is not a separate namespace, and the suffix is voluntary since file system permissions are used to decide whether a file is executable.

According to block 230, the transcription request is associated with one or more functions. The cloud server provides a broad range of processing or transcription services for files. These services are performed as functions on the file. By way of example, such functions include, but are not limited to, converting files and/or documents from one form or type to another form or type (e.g., converting a written PDF file to an audio file), translating the file or document (e.g., converting a file written in English to French), adding content to a file or document (e.g., adding a watermark to a file).

According to block 240, the one or more functions are executed on the file in accordance with the transcription request. A single file can be processed with a plurality of different functions. For example, a user can transmit a DOC file with a transcription request that requests the file include a watermark designated by the user and be printed to a specified printer. By way of example, a transcription request is as follows: Print Diagrams.Visio Printer=CloudPrinter21 WaterMarkType=Image WaterMark=Draft.JPG. In this example, assume that the CloudPrinter21 can interpret PDF data. The functions involved are inserting watermark and producing PDF stream.

As an example, a Diagrams.Visio file is converted to PDF (e.g., with the help of Microsoft Visio tool). The next application in use is PDF writer to insert Draft.JPG as a watermark on each page of the converted PDF file.

By way of example, in order to insert a watermark in a Doc file, a user could open the Doc file (e.g., double-click on the file), select an "add watermark" function from a drop down menu, find a watermark stored on the computer, and insert the watermark in the Doc file. Here, the user has explicit knowledge of the document type and application inserting the watermark (i.e., the user knows which menu option to select, how to locate and insert the watermark, etc.). In the cloud environment in example embodiments, this association automatically and dynamically occurs when the document and transcription request are received. For example, when the cloud server receives the transcription request, the server automatically associates the document with the corresponding application and applies the desired function. In this example, the cloud server automatically recognizes the Doc file and performs the function to insert the designated watermark. The file format of the file is changed to a file format that is compatible with one or more of the plural different application in order to alter the format of the file according to the transcription request.

According to block 250, the transcribed file is transmitted from the cloud server to the remote electronic device. For example as shown in FIG. 1, the cloud server 120 transmits the transcribed file through networks 150 to remote electronic device 110. By way of example, the cloud server transmits the Doc file having the designated watermark back to the user.

Figure 3:
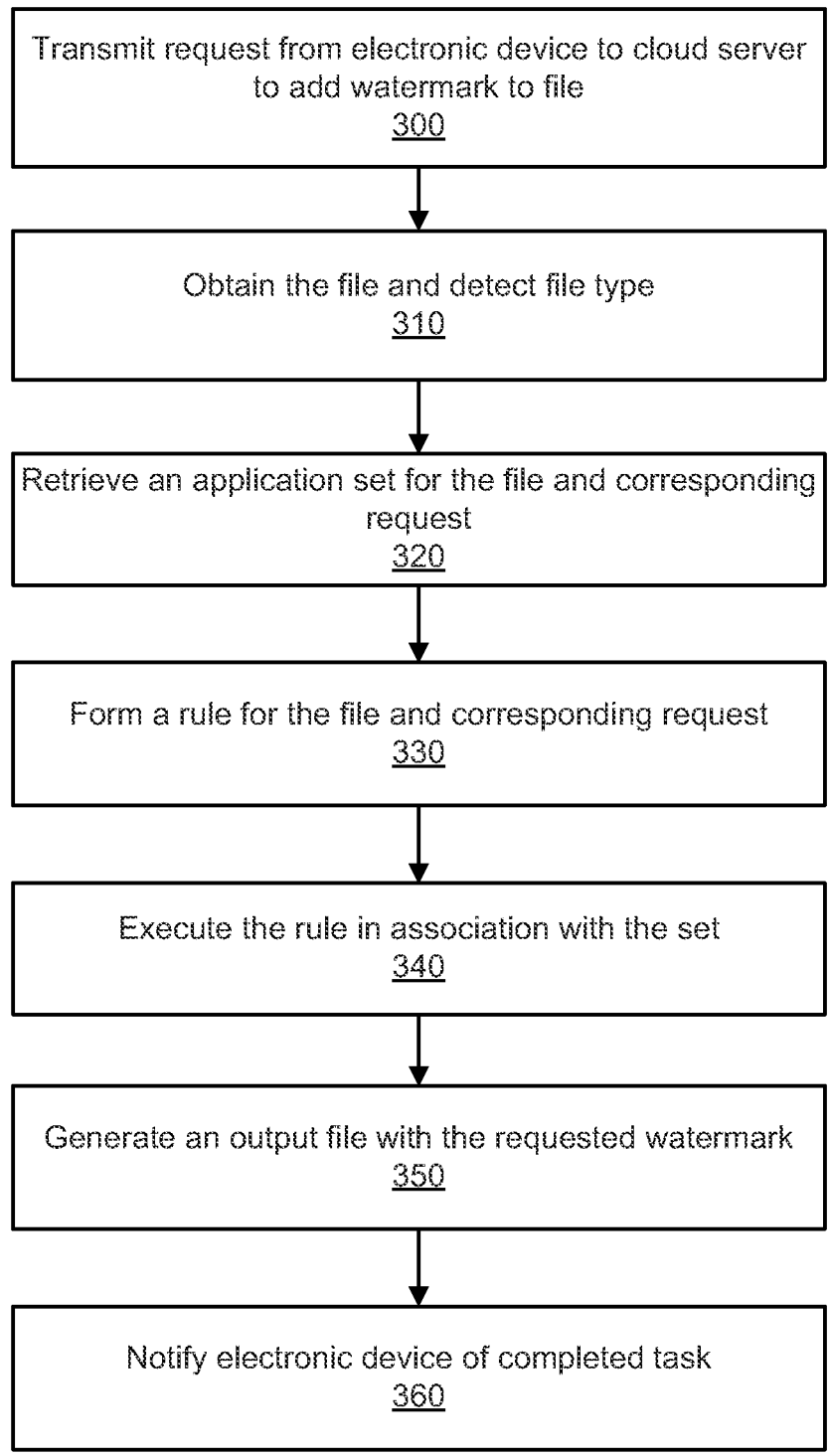
FIG. 3 shows a flow diagram to add a watermark to a file received from a remote electronic device in accordance with an example embodiment.

FIG. 3 shows a flow diagram to add a watermark to a file or document received from a remote electronic device in accordance with an example embodiment.

According to block 300, a request is transmitted from an electronic device to a cloud server to add a watermark to a file.

According to block 310, the cloud server obtains the file and detects a file type. For example, the cloud server obtains the file from a designated web or internet location, retrieves the file from storage or memory, or receives the file from the electronic device. The cloud server also determines the type of file received (e.g., BMP, JPG, GIF, PNG, TIF, MDI, XPS, ICO, MAC PS, PCL, PDF, TXT, LOG HTML, XSL, DTD, JAVA, JS, ASP, PY, DOC, XLS, PPT, C, C++, PAS, MP3, WAV, QTP, BIN, EXE, COM, DLL, OBJ, CTM, IDX, DB, ZIP, CAB, RARA, MSI, DSW, FLASH, VIDEO, AUTOCAD, etc.).

According to block 320, the cloud server retrieves an application set for the file and corresponding request.

According to block 330, a rule is formed for the file and the corresponding request.

According to block 340, the rule is executed in association with the set. By way of example, a user can desire to insert a watermark into a text document (e.g., Doc file). The user sends the watermark as an image or text to the cloud server, and the watermark is inserted as an image. If the watermark is sent as text, the cloud server translates the text into an image and inserts the watermark in the file.

According to block 350, an output file is generated with the requested watermark. By way of example, the user can send a DOC file to the cloud server and request that a text based watermark be inserted into the DOC file as an image. The watermark can be developed by the user and transmitted to the cloud server. The cloud server, in turn, translates the text to an image object and then inserts the image object into the DOC file.

According to block 360, the user and/or electronic device is notified of the completed task. For example, the file with addition of the watermark is transmitted to the electronic device making the original request. Alternatively, a user could be notified that the task is complete (e.g., via a text message, email, print out to a designated printer, etc.).

The following three use cases illustrate examples for the flow diagram of FIG. 3.

Use Case 1
Input Format: DOC (e.g., Agreement.Doc)
Output Format: DOC
Function: Watermark
Quality of Service: Medium {Medium performance, Output quality compromised}
The following steps are performed for Use Case 1:

a) Find Input File Type based on extension or MIME type
b) Input Format Processors
　　{DOCToXML, Microsoft Office, OpenOffice, DOCToPDF}
c) Generate Function Processor list
　　{MSWaterMark, OOWaterMark, XMLWaterMark, ImageWaterMark, GlobeWaterMark}
d) Output Format Generators
　　{DOCToDOC, XMLToDOC, PDFToDOC, ImageToDOC}
e) Rules and Associations
　　{
　　(DOCToXML, (MSWaterMark, XMLWaterMark)),
　　(Microsoft Office, (MSWaterMark)),
　　(OpenOffice, (OOWaterMark, ImageWaterMark))
　　}
f) If (QoS == Medium)
　　- Convert DOCToXML
　　- Apply XMLWaterMark by passing string value
　　　　(e.g., CONFIDENTIAL, SAMPLE ...) and location of string
　　- Convert XMLToDOC
g) Close.

In this use case, MSWaterMark, OOWaterMark, XMLWaterMark, XMLToDOC, etc. are binaries or scripts that perform specific functions. Furthermore, the choice of the format processor (application on the cloud) need not be the same as that of the client user. Further yet, an editor application with the required feature need not exist on the client system (e.g., on the user device of the client sending the document and transcription request). Further yet, the platform (e.g., Linux versus Windows) used to process the request can differ.

Multiple different approaches can be used to add the watermark on the cloud. For instance, the cloud uses Microsoft Office to execute the script and to add the watermark. As another example, the Doc file is translated to an XML format; the watermark is added for each page by a tool; and the XML file is converted back to a Doc file.

Use Case 2
Input File Format: PDF (e.g., Agreement.PDF)
Output File Format: DOC
Function: Watermark
Quality of Service: High
The following steps are performed for Use Case 2:

h) Find Input File Type based on extension or MIME type
i) Input Format Processors
　　{PDFToXML, PDFWriter, PDFToDoc}
j) Generate Function Processor list
　　{MSWaterMark, OOWaterMark, XMLWaterMark, ImageWaterMark, GlobeWaterMark}
k) Output Format Generators
　　{DOCToDOC, XMLToDOC, PDFToDOC, ImageToDOC}
l) Rules and Associations
　　{
　　(PDFToXML, (MSWaterMark, XMLWaterMark)),
　　(PDFWriter, (XMLWaterMark, ImageWaterMark, GlobeWaterMark)),
　　(PDFToDoc, (OOWaterMark, ImageWaterMark)),
　　(XMLToDoc, (None)),
　　}
m) If (QoS == Medium)
　　- Use PDFToXML
　　- Apply XMLWaterMark by passing string value (e.g., CONFIDENTIAL, SAMPLE, ...) and location of string
　　- Use XMLToDOC
n) If (QoS == High)
　　a. Use PDFWriter
　　b. Apply ImageWaterMark by passing string value (e.g., CONFIDENTIAL, SAMPLE, ...) and location of string
　　c. Use PDFToDOC
o) If (QoS == OutputCalibrated)
　　a. Use PDFWriter
　　b. Apply ImageWaterMark by passing string value (e.g., CONFIDENTIAL, SAMPLE, ...) and location of string
　　c. Insert Printer Calibration module
p) Close.

In this use case, MSWaterMark, OOWaterMark, XMLWaterMark, XMLToDOC . . . are binaries or scripts that perform specific functions. Furthermore, the quality of service (QoS) as OutputCalibrated is provided here but QoS need not be only on performance or digital production point of view. QoS can also be associated with the output device characteristics. The example essentially produces a PDF, and the PDF file is embedded with printer calibration command set.

Use Case 3

Open Agreement.Doc for playing in MP3 mode

1. Load the DOC file into MP3 player
2. Play the file

In a conventional approach, the electronic device would fail to recognize the MIME type and the file would not be played. In the cloud environment of example embodiments, however, the file is successfully recognized and played as follows:

1. User/Player requests for an operation from the Cloud
2. Cloud has DOC format processor—OpenOffice, Microsoft Office, etc.,
3. Translate DOC to PDF—Microsoft Office, OpenOffice, Printer Drivers, Third Party tools
4. Convert PDF file to MP3—Third Party tool.

Figure 4:
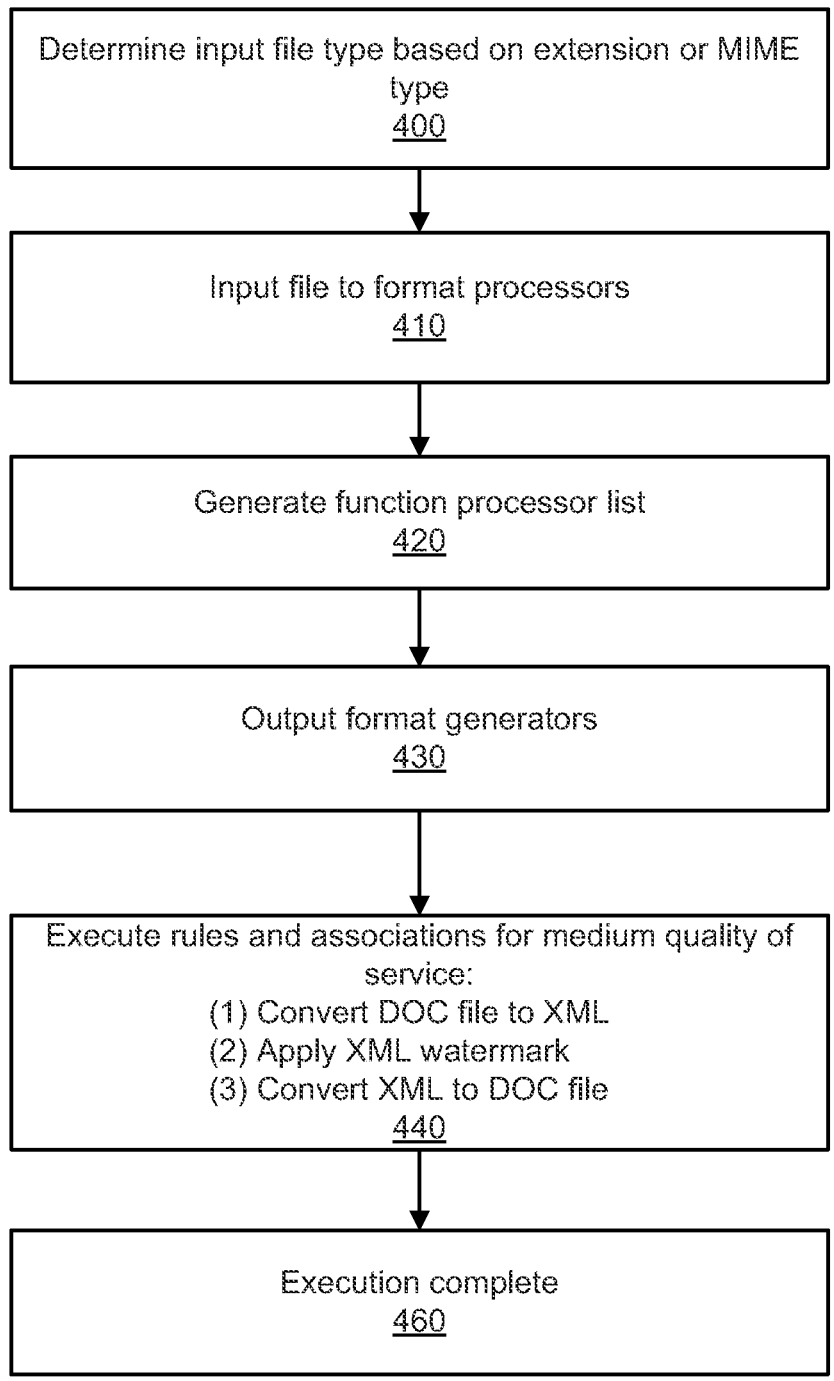
FIG. 4 shows a flow diagram showing functions of a cloud server to add a watermark to a file given one set of requirements in accordance with an example embodiment.
Figure 5:
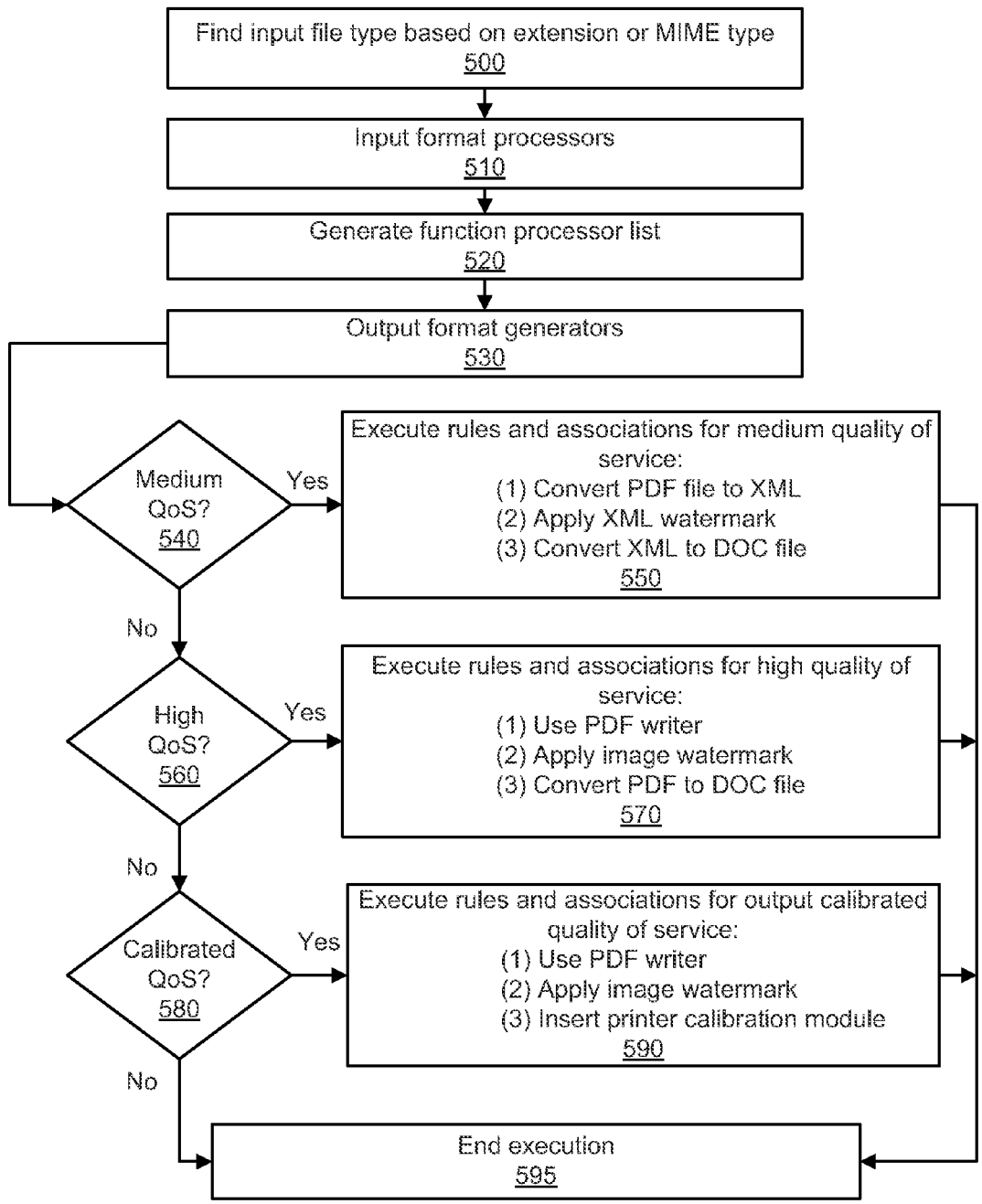
FIG. 5 shows a flow diagram showing functions of a cloud server to add a watermark to a file given another set of requirements in accordance with an example embodiment.

The cloud server can perform various functions for the user and/or electronic device with different degrees of quality. By way of example, qualities of service (QoS) can range from low QoS to high QoS. Selection of a particular QoS can be based on a user request (e.g., a user includes a high QoS request in a transcription request), available processing resources or busyness of a selected function, speed of request (e.g., a request for a transcription may be performed at a lower QoS to provide the transcription back to the electronic device in real-time), etc. FIGS. 4 and 5 show two examples of transcription requests to add a watermark with a different QoS.

FIG. 4 shows a flow diagram showing functions of a cloud server to add a watermark to a file given one set of requirements in accordance with an example embodiment. By way of example, the QoS is designated as being medium and the input and output formats are DOC files.

According to block 400, an input file type is determined based on a file extension or MIME (multipurpose internet mail extension) type.

According to block 410, the file is input to the format processors. Processors can be designated for certain tasks. For example, a processor can be designated for converting DOC files to PDF files with a low QoS. As another example, consider the case of a PDF file: The input file format can be processed by a list of format processors such as PDFToXML, PDFWriter, PDFToDoc. Furthermore, the system can include a collection of such lists (static or dynamic) that are obtained. The choice of this list is based on the associated rules/request.

According to block 420, a function processor list is generated. Examples of a list of function processors include, but are not limited to, MSWaterMark, OOWaterMark, XMLWaterMark, ImageWaterMark, and GlobeWaterMark. MSWaterMark is used when operating with Microsoft Office suite, and GlobeWaterMark is used to introduce a Globe Icon (internally with the help of ImageWaterMark, as example). Furthermore, the system can include a collection of such lists (static or dynamic) that are obtained. The choice of this list is based on the associated rules/request.

According to block 430, the file is output from the format generators. Examples of output Format Generators include, but are not limited to, DocToDoc, XMLToDoc, PDFToDoc, and ImageToDoc. On application of a user requested function, an intermediate data is transformed to an output format using one or more of these output generators by application associated rules/request.

According to block 440, the rules and associations are executed for the designated medium QoS. For example, this execution occurs as follows:

(1) Convert the DOC file to XML (extensible markup language);
(2) Apply the XML watermark (e.g., watermark designated by the user); and
(3) Convert the XML file to a DOC file.

As another example, for a QoS that is high, the PDFWriter is used along with the ImageWaterMark and converted to DOC format using PDFToDoc.

According to block 460, the execution is complete. The user or electronic device can be notified and/or the DOC file with watermark transmitted to the user or electronic device.

FIG. 5 shows a flow diagram showing functions of a cloud server to add a watermark to a file given another set of requirements in accordance with an example embodiment. By way of example, the QoS is selectable (medium, high, or calibrated), the input format is PDF file, and the output format is a DOC file.

According to block 500, an input file type is determined based on a file extension or MIME (multipurpose internet mail extension) type.

According to block 510, the file is input to the format processors. Processors can be designated for certain tasks. For example, a processor can be designated for converting DOC files to PDF files with a low QoS. As another example, consider the case of a PDF file: The input file format can be processed by a list of format processors such as PDFToXML, PDFWriter, PDFToDoc. Furthermore, the system can include a collection of such lists (static or dynamic) that are obtained. The choice of this list is based on the associated rules/request.

According to block 520, a function processor list is generated. Examples of a list of function processors include, but are not limited to, MSWaterMark, OOWaterMark, XMLWaterMark, ImageWaterMark, and GlobeWaterMark. MSWaterMark is used when operating with Microsoft Office suite, and GlobeWaterMark is used to introduce a Globe Icon (internally with the help of ImageWaterMark, as example). Furthermore, the system can include a collection of such lists (static or dynamic) that are obtained. The choice of this list is based on the associated rules/request.

According to block 530, the file is output from the format generators. Examples of output Format Generators include, but are not limited to, DocToDoc, XMLToDoc, PDFToDoc, and ImageToDoc. On application of a user requested function, an intermediate data is transformed to an output format using one or more of these output generators by application associated rules/request.

According to block 540, a decision is made as to whether the QoS is medium. If the QoS is medium, then flow proceeds to block 550. Here, the rules and associations are executed for a medium QoS as follows:

(1) Convert the PDF file to XML;
(2) Apply the XML watermark; and
(3) Convert the XML file to a DOC file.

If the QoS is not medium, then flow proceeds to block 560 where a decision is made as to whether the QoS is high. If the QoS is high, flow proceeds to block 570. Here, the rules and associations are executed for a high QoS as follows:

(1) Use a PDF writer;
(2) Apply an image watermark; and
(3) Convert the PDF file to a DOC file.

If the QoS is not high, then flow proceeds to block 580 where a decision is made as to whether the QoS is calibrated.

If the QoS is calibrated, flow proceeds to block 590. Here, the rules and associations are executed for a calibrated QoS as follows:
(1) Use a PDF writer;
(2) Apply an image watermark; and
(3) Insert printer calibration module.

If the QoS is not calibrated, then flow proceeds to block 595 and execution ends.

Figure 6:
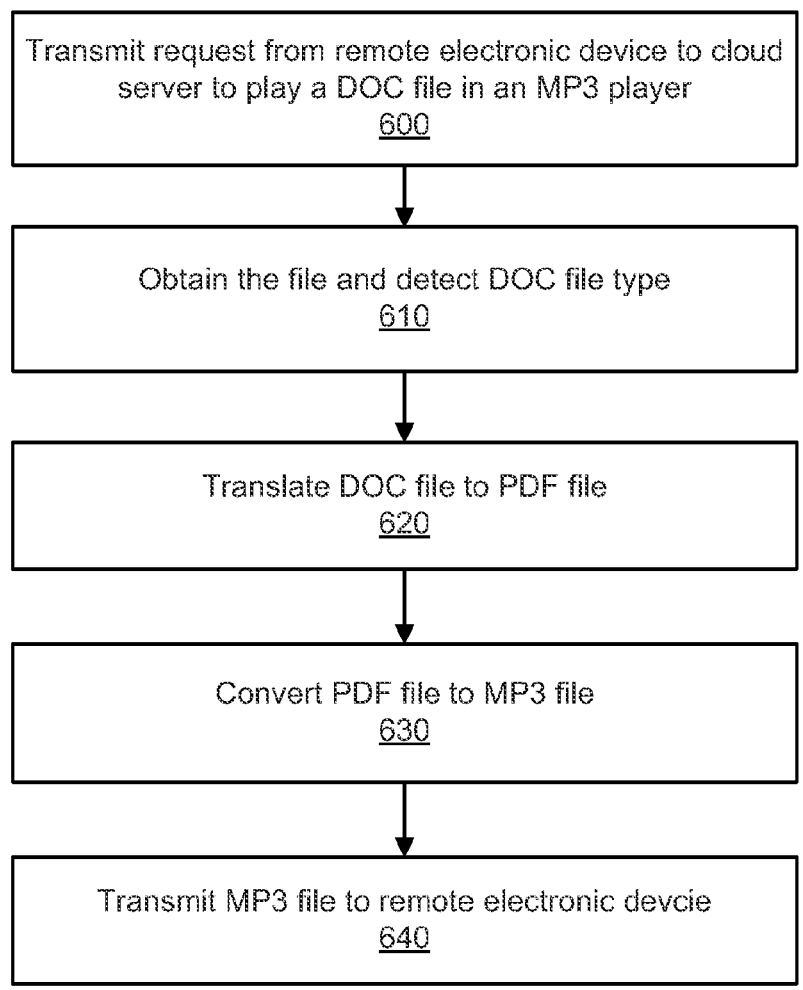
FIG. 6 shows a flow diagram to translate a DOC file to an MP3 file for a remote electronic device in accordance with an example embodiment.

FIG. 6 shows a flow diagram to translate a DOC file to an MP3 (MPEG-1 audio layer 3) file for a remote electronic device in accordance with an example embodiment.

According to block 600, a request is transmitted from a remote electronic device to the cloud server to play a DOC file in an MP3 player. The request and accompanying task is submitted to an input format processor and processed as explained above in connection with blocks 410-430.

According to block 610, the file is obtained and DOC file type detected. For example, the cloud server obtains the file from a designated web or internet location, retrieves the file from storage or memory, or receives the file from the electronic device.

According to block 620, the cloud server translates the DOC file to a PDF file.

According to block 630, the cloud server converts the PDF file to an MP3 file.

According to block 640, the cloud server transmits the MP3 file to the requesting remote electronic device.

Example embodiments are not limited to converting DOC files to MP3. By way of example, other files can be converted to MP3, such other files include, but are not limited to, DOCX, ODT, PDF, TXT, WPD, WPS, PUB, etc.

Figure 7:
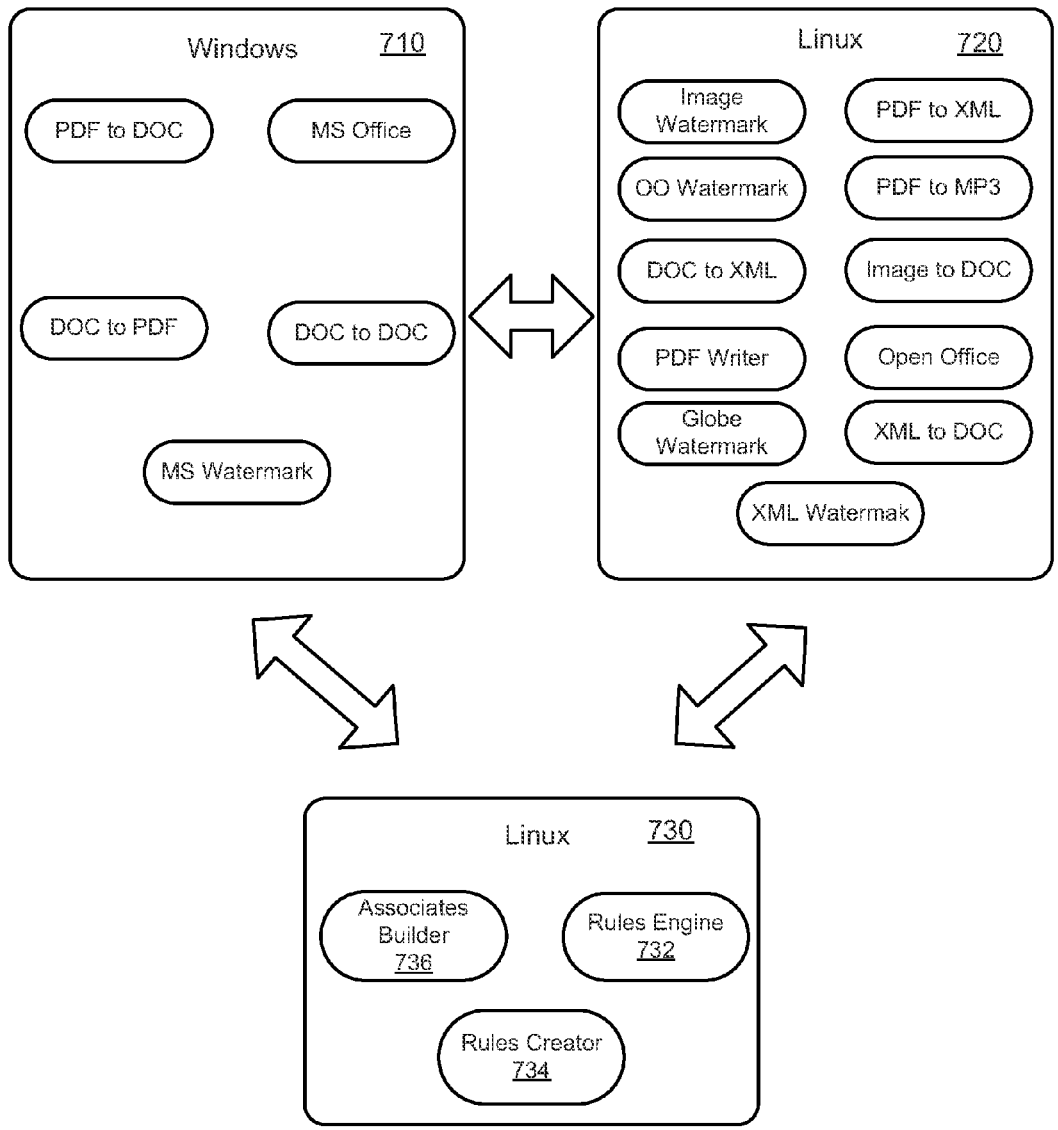
FIG. 7 shows a diagram of multiple processors executing different types of platforms in accordance with an example embodiment.

FIG. 7 shows a diagram of multiple processors executing different types of entities (applications) that are executing on specific platforms in a distributed cloud computing environment in accordance with an example embodiment. A windows processing unit 710 include various translators and/or conversion functions, such as PDF to DOC, DOC to PDF, DOC to DOC, MS Watermark, and MS Office.

A Linux processing unit 720 includes various translators and/or conversion functions, such as Image Watermark, OO Watermark, DOC to XML, PDF Writer, Globe Watermark, XML Watermark, PDF to XML, PDF to MP3, Image to DOC, Open Office, and XML to DOC.

A second Linux processing unit 730 includes a rules engine 732, a rules creator 734, and an associates builder 736.

A respective entity is applied based on a set of rules for a desired output. For example, PDFToDoc function in the windows processing unit 710 performs only conversion of PDF documents to DOC(x) file formats. The MS Watermark in the windows processing unit 710 is a script/binary that uses MS Office tailored to introduce watermarks in the office documents. The Globe Watermark running on Linux in the Linux processing unit 720 introduces a Globe as a watermark in the document. The PDF Writer application in the Linux processing unit 720 is used by Image Watermark when requested to add an image watermark into a PDF file.

The rules engine 732 is a component that executes the rules of an association.

The rules creator 734 is a component that creates rules for a given request.

The associates builder 736 is a component that builds the association between the request and various elements.

Figure 8:
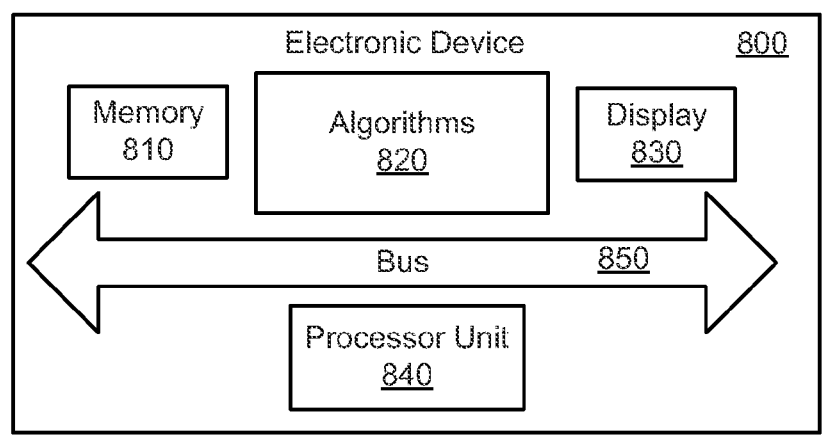
FIG. 8 is a computer system in a cloud print system in accordance with an example embodiment.

FIG. 8 is a block diagram of an electronic device 800 in a cloud system in accordance with an example embodiment. The electronic device 800 includes memory 810, algorithms 820, display 830, processing unit 840, and one or more buses 850. The processor unit includes a processor (such as a central processing unit, CPU, microprocessor, application-specific integrated circuit (ASIC), etc.) for controlling the overall operation of memory 810 (such as random access memory (RAM) for temporary data storage, read only memory (ROM) for permanent data storage, and firmware). The processing unit 840 communicates with memory 810 and algorithms 820 via one or more buses 850 and performs operations and tasks that implement one or more blocks of the flow diagrams discussed herein. The memory 810, for example, stores applications, data, programs, algorithms (including software to implement or assist in implementing embodiments in accordance with the present invention) and other data.

In one example embodiment, the electronic device 800 is a cloud server. The algorithms 820 include programming modules and/or instructions to execute the flow diagrams of FIGS. 2-6. Furthermore, processing unit 840 includes multiple processors, such as input format processors (e.g., a DOC format processor).

As used herein and in the claims, the following words are defined as follows:

The term "cloud" is a computer network accessible over the internet and/or web that is dynamically scalable with virtualized resources, such as printing resources. Users are not required to have knowledge or expertise in the infrastructure of the cloud that relies on the internet to satisfy the computing or printing needs of users. The cloud provides computer and/or printing device services with business applications that are accessible from a web browser while software and data are stored on servers in the cloud. For example, a printing cloud system supports infrastructure for printing device services, platform for the printing device services, and software for the printing device services.

The term "file" has broad application and includes electronic articles and documents (example, files produced or edited from a software application), collection of related data, and/or sequence of related information (such as a sequence of electronic bits) stored in a computer. In one exemplary embodiment, files are created with software applications and include a particular file format (i.e., way information is encoded for storage) and a file name. Embodiments in accordance with the present invention include numerous different types of files such as, but not limited to, image and text files (a file that holds text or graphics, such as ASCII files: American Standard Code for Information Interchange; HTML files: Hyper Text Markup Language; PDF files: Portable Document Format; and Postscript files; TIFF: Tagged Image File Format; JPEG/JPG: Joint Photographic Experts Group; GIF: Graphics Interchange Format; etc.).

The term "printing device" is an electronic device that performs one or more functions of printing, scanning, and copying. In one embodiment, a printing device is a printer. A printing device, however, is not limited to printers, but includes other devices, such as a scanner, a copier, a machine with facsimile operations, and/or a multi-functional device that performs two or more functions of printing, scanning, copying, and faxing.

The term "world wide web" or "web" is a system of linked hypertext documents access through the internet. Using a web browser, a user can view web pages that include text, images, video, and other media and navigate between these pages with hyperlinks.

In one example embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with example embodiments of the present invention are provided as examples and should not be construed to limit other embodiments within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing example embodiments. Such specific information is not provided to limit the invention.

In some example embodiments, the methods illustrated herein and data and instructions associated therewith are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the various embodiments in accordance with the present invention, embodiments are implemented as a method, system, and/or apparatus. As one example, example embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known physical and tangible media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method executed by a computer in a network, comprising:
   receiving from a first portable electronic device, at the computer and over the network, a file and a transcription request to alter contents of the file;
   associating the file with a file format;
   associating the transcription request with a function that will alter the contents of the file according to the transcription request;
   executing the function on the file to convert the file format and to alter the contents of the file according to the transcription request; and
   transmitting the file, including the converted file format and the altered contents, over the network to the first portable electronic device.

2. The method of claim 1, wherein executing the function comprises:
   converting the file format from a Doc file format to an Extensible Markup Language (XML) file format;
   adding a watermark to the contents of the file; and
   converting the file format back to the Doc file format.

3. The method of claim 1, wherein executing the function comprises:
   executing a Portable Document Format (PDF) writer to convert the file format to a PDF file format;
   altering the contents of the file according to the transcription request with the file being in the PDF format; and
   converting the file back to the file format.

4. The method of claim 1, wherein
   the transcription request includes a quality of service (QoS) request, wherein altering the contents of the file is performed according to the QoS request.

5. The method of claim 1,
   wherein converting the file format includes translating the file format from a Doc file format to a Portable Document Format (PDF) file format and converting the PDF file format to an MP3 file format, and
   wherein transmitting the file includes transmitting the file in the MP3 file format.

6. The method of claim 1, wherein the network comprises an internet and wherein the portable electronic device comprises a remote handheld electronic device, and further comprising:
   notifying the remote handheld electronic device after executing the function on the file.

7. The method of claim 1, wherein executing the function comprises:
   executing the function on the file to translate the file from a first language to a second language; and
   wherein transmitting the file includes transmitting the file in the second language.

8. A computer software product comprising:
   a tangible computer readable storage medium having instructions to cause a server in a network to:
      receive from a portable electronic device, at the server and over the network, a file in a first file format and a transcription request to convert the first file format;
      determine a function to execute that will convert the first file format according to the transcription request;
      execute the function on the file, according to the transcription request, to alter the contents of the file and to convert the first file format to a second file format according to the transcription request; and transmit the file in the second file format to the portable electronic device.

9. The computer software product of claim 8, wherein execution of the function further causes the server to:
examine a file extension of the file to determine a type of the file; and
change the type of the file in order to convert the first file format to the second file format.

10. The computer software product of claim 8, wherein the first file format includes a Doc file format or a Portable Document Format (PDF) file format, and wherein the second file format includes an MP3 file format that can be played on the portable electronic device.

11. The computer software product of claim 8, wherein execution of the function further causes the server to:
associate the file with plural different applications based on a Multipurpose Internet Mail Extension (MIME) type of the file; and wherein the second file format is compatible with the plural different applications.

12. The computer software product of claim 8 wherein the first file format is a Portable Document Format (PDF) file format and the second file format is an audio file.

13. The computer software product of claim 8, wherein the first file format is a Doc file format and, prior to execution of the function, the instructions cause the server to convert the first file format to an intermediate Extensible Markup Language (XML) file format in order to execute the function on the file, and wherein execution of the function causes the server to convert the file from the intermediate file format to the second file format prior to transmission of the file to the portable electronic device, wherein the second file format is a Doc file format.

14. A computer, comprising:
a memory storing instructions; and
a processor in communication with the memory to execute the instructions to:
receive, from a first portable electronic device, a file and a transcription request to alter contents of the file;
determine an executable function to alter the contents of the file according to the transcription request;
execute the function on the file; and
transmit the file with the altered contents to the first portable electronic device.

15. The computer of claim 14, wherein the computer is a cloud server that receives the file and transcription request over an internet from the first portable electronic device.

16. The computer of claim 14,
wherein the processor further executes the instructions to:
associate the file with a first file format based on a file extension of the file;
convert the first file format of the file to a second file format in order to execute the function on the file to alter the contents of the file according to the transcription request;
convert the file back to the first file format to transmit the file to the portable electronic device.

17. The computer of claim 14, wherein the function executes on the file to generate a Portable Document Format (PDF) file that includes a printer calibration command set embedded in the file.

18. The computer of claim 14, wherein the function executes on the file to insert a watermark in the file.

19. The computer of claim 14, wherein the processor further executes the instructions to receive, over a network and from a portable electronic device, a quality of service (QoS) request for the file, wherein the function is executed on the file in accordance with the QoS service to alter the contents of the file.

20. The computer of claim 14 wherein the processor further executes the instructions to execute a Portable Document Format (PDF) writer to convert the file to a PDF file in order to execute the function on the file to alter the contents of the file according to the transcription request.

* * * * *

UNITED STATES PATENT AND TRADEMARK OFFICE
CERTIFICATE OF CORRECTION

PATENT NO. : 8,909,675 B2  
APPLICATION NO. : 13/639266  
DATED : December 9, 2014  
INVENTOR(S) : Harish B. Kamath et al.

Page 1 of 1

It is certified that error appears in the above-identified patent and that said Letters Patent is hereby corrected as shown below:

On the Title page, in item (75), Inventors, in column 1, lines 1-2, delete "Bangalooru Karanataka" and insert -- Bangalore Karnataka --, therefor.

Signed and Sealed this
Twenty-second Day of December, 2015

Michelle K. Lee
*Director of the United States Patent and Trademark Office*